US007225200B2

(12) United States Patent
Chickering et al.

(10) Patent No.: US 7,225,200 B2
(45) Date of Patent: May 29, 2007

(54) AUTOMATIC DATA PERSPECTIVE GENERATION FOR A TARGET VARIABLE

(75) Inventors: David M. Chickering, Bellevue, WA (US); Bo Thiesson, Woodinville, WA (US); Carl M. Kadie, Bellevue, WA (US); David E. Heckerman, Bellevue, WA (US); Christopher A. Meek, Kirkland, WA (US); Allan Folting, Redmond, WA (US); Eric B. Vigesaa, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 505 days.

(21) Appl. No.: 10/824,108

(22) Filed: Apr. 14, 2004

(65) Prior Publication Data

US 2005/0234960 A1   Oct. 20, 2005

(51) Int. Cl.
*G06F 17/00* (2006.01)
*G06F 7/00* (2006.01)
(52) U.S. Cl. .................................... 707/102; 707/6
(58) Field of Classification Search ............... 707/102, 707/6
See application file for complete search history.

(56) References Cited

U.S. PATENT DOCUMENTS

| | | | |
|---|---|---|---|
| 5,781,896 A | 7/1998 | Dalal | |
| 6,044,366 A | 3/2000 | Graffe et al. | |
| 6,216,134 B1 | 4/2001 | Heckerman et al. | |
| 6,298,342 B1 | 10/2001 | Graefe et al. | |
| 6,360,224 B1 | 3/2002 | Chickering | |
| 6,374,251 B1 | 4/2002 | Fayyad et al. | |
| 6,405,207 B1 | 6/2002 | Petculescu et al. | |
| 6,411,313 B1 | 6/2002 | Conlon et al. | |
| 6,430,545 B1 * | 8/2002 | Honarvar et al. | ............. 706/47 |
| 6,484,163 B1 | 11/2002 | Lawrence et al. | |

(Continued)

FOREIGN PATENT DOCUMENTS

EP        0863469        9/1998

(Continued)

OTHER PUBLICATIONS

European Search Report dated Jun. 1, 2006 for European Patent Application Serial No. EP 05 10 2695, 3 pages.

(Continued)

*Primary Examiner*—Apu Mofiz
*Assistant Examiner*—Cindy Nguyen
(74) *Attorney, Agent, or Firm*—Amin, Turocy & Calvin, LLP

(57) ABSTRACT

The present invention leverages machine learning techniques to provide automatic generation of conditioning variables for constructing a data perspective for a given target variable. The present invention determines and analyzes the best target variable predictors for a given target variable, employing them to facilitate the conveying of information about the target variable to a user. It automatically discretizes continuous and discrete variables utilized as target variable predictors to establish their granularity. In other instances of the present invention, a complexity and/or utility parameter can be specified to facilitate generation of the data perspective via analyzing a best target variable predictor versus the complexity of the conditioning variable(s) and/or utility. The present invention can also adjust the conditioning variables (i.e., target variable predictors) of the data perspective to provide an optimum view and/or accept control inputs from a user to guide/control the generation of the data perspective.

35 Claims, 13 Drawing Sheets

U.S. PATENT DOCUMENTS

| | | | |
|---|---|---|---|
| 6,505,185 | B1 | 1/2003 | Chickering |
| 6,519,599 | B1 | 2/2003 | Chickering et al. |
| 6,626,959 | B1 | 9/2003 | Moise et al. |
| 7,089,266 | B2 * | 8/2006 | Stolte et al. ............. 707/104.1 |
| 2002/0099581 | A1 * | 7/2002 | Chu et al. ...................... 705/7 |
| 2005/0021489 | A1 * | 1/2005 | MacLennan et al. ........... 707/1 |

FOREIGN PATENT DOCUMENTS

| | | |
|---|---|---|
| EP | 1195694 | 4/2002 |
| EP | 1462957 | 9/2004 |
| JP | 10010995 | 1/1998 |

OTHER PUBLICATIONS

Hendrik Blockeel, et al., Scalability and Efficiency in Multi-Relational Data Mining, ACM SIGKDD Explorations Newsletter, Jul. 2003, pp. 17-30, vol. 5 Iss. 1, ACM.

Michael Goebel, et al., A Survey of Data Mining and Knowledge Discovery Software Tools, ACM SIGKDD, Jun. 1999, pp. 20-33, vol. 1 Iss. 1.

Karim K. Hirji, Exploring Data Mining Implementation, Communications of the ACM, Jul. 2001, pp. 87-93, vol. 44 No. 7.

Jiawei Han, et al., DBMiner: A System for Data Mining in Relational Databases and Data Warehouses, 1997 Conference of the Centre for Advanced Studies on Collaborative Research, 1997, pp. 1-12.

Stephen G. Eick, Visualizing Multi-Dimensional Data, Computer Graphics Feb. 2000, 2000, pp. 81-87.

Steven Tolkin, Aggregation Everywhere: Data Reduction and Transformation in the Phoenix Data Warehouse, DOLAP 99, 1999, pp. 79-86, ACM, Kansas City, MO.

* cited by examiner

| 402 | 404 | 406 | 408 | |
|---|---|---|---|---|
| Region | Representative | Month | Sales | |
| North | Smith | January-03 | $ | 512.00 |
| North | Sam | March-03 | $ | 200.00 |
| North | Sam | July-03 | $ | 100.00 |
| North | Becky | August-03 | $ | 800.00 |
| West | Jones | September-03 | $ | 1,500.00 |
| West | Noah | October-03 | $ | 2,000.00 |
| East | Vin | April-03 | $ | 200.00 |
| East | Min | May-03 | $ | 100.00 |
| East | Alf | June-03 | $ | 800.00 |
| South | Chen | January-03 | $ | 800.00 |
| South | Kirk | February-03 | $ | 1,500.00 |

FIG. 4

| Sum of Sales | Region | | | | | |
|---|---|---|---|---|---|---|
| Representative | East | North | South | West | (blank) | Grand Total |
| Alf | 3100 | | | | | 3100 |
| Alice | | | 800 | | | 800 |
| Becky | | 2800 | | | | 2800 |
| Chen | | | 3900 | | | 3900 |
| David | | | 424 | | | 424 |
| John | | | | 1512 | | 1512 |
| Jones | | | | 2700 | | 2700 |
| Kirk | | | 6300 | | | 6300 |
| Kurt | | | 3800 | | | 3800 |
| Min | 1800 | | | | 1100 | 2900 |
| Noah | | | | 2200 | | 2200 |
| Sally | | | | 2300 | | 2300 |
| Sam | | 2100 | | | | 2100 |
| Smith | | 724 | | | | 724 |
| Vin | 2812 | | | | | 2812 |
| (blank) | | 100 | | | | 100 |
| Grand Total | 7712 | 5724 | 15224 | 8712 | 1100 | 38472 |

FIG. 5

AUTOMATIC DATA PERSPECTIVE GENERATION FOR A TARGET VARIABLE

TECHNICAL FIELD

The present invention relates generally to data mining, and more particularly to systems and methods for providing automatic generation of conditioning variables of a data perspective based on user-specified inputs.

BACKGROUND OF THE INVENTION

Digitizing information allows vast amounts of data to be stored in incredibly small amounts of space. The process, for example, permits the storage of the contents of a library to be captured on a single computer hard drive. This is possible because the data is converted into binary states that can be stored via digital encoding devices onto various types of digital storage media, such as hard drives, CD-ROM disks, and floppy disks. As digital storage technology progresses, the density of the storage devices allows substantially more data to be stored in a given amount of space, the density of the data limited mainly by physics and manufacturing processes.

With increased storage capacity, the challenges of effective data retrieval are also increased, making it paramount that the data be easily accessible. For example, the fact that a library has a book, but cannot locate it, does not help a patron who would like to read the book. Likewise, just digitizing data is not a step forward unless it can be readily accessed. This has led to the creation of data structures that facilitate in efficient data retrieval. These structures are generally known as "databases." A database contains data in a structured format to provide efficient access to the data. Structuring the data storage permits higher efficiencies in retrieving the data than by unstructured data storage. Indexing and other organizational techniques can be applied as well. Relationships between the data can also be stored along with the data, enhancing the data's value.

In the early period of database development, a user would generally view "raw data" or data that is viewed exactly as it was entered into the database. Techniques were eventually developed to allow the data to be formatted, manipulated, and viewed in more efficient manners. This allowed, for instance, a user to apply mathematical operators to the data and even create reports. Business users could access information such as "total sales" from data in the database that contained only individual sales. User interfaces continued to be developed to further facilitate in retrieving and displaying data in a user-friendly format. Users eventually came to appreciate that different views of the data, such as total sales from individual sales, allowed them to obtain additional information from the raw data in the database. This gleaning of additional data is known as "data mining" and produces "meta data" (ie., data about data). Data mining allows valuable additional information to be extracted from the raw data. This is especially useful in business where information can be found to explain business sales and production output, beyond results solely from the raw input data of a database.

Thus, data manipulation allows crucial information to be extracted from raw data. This manipulation of the data is possible because of the digital nature of the stored data. Vast amounts of digitized data can be viewed from different aspects substantially faster than if attempted by hand. Each new perspective of the data may enable a user to gain additional insight about the data. This is a very powerful concept that can drive businesses to success with it, or to failure without it. Trend analysis, cause and effect analysis, impact studies, and forecasting, for example, can be determined from raw data entered into a database—their value and timeliness predicated by having intuitive, user-friendly access to the digitized information.

Currently, data manipulation to increase data mining capabilities requires substantial user input and knowledge to instruct a manipulation program on how to best view the data to extract a desired parameter. This requires that a user must have intimate knowledge of the data and insight into what can be gleaned from the data. Without this prior knowledge, a user must try a 'hit and miss' approach, hoping to hit upon the right perspective of the data to retrieve the desired additional information (mined data). This approach is typically beyond the casual user and/or is too time consuming for an advanced user. The amount of stored data is generally too vast and complex in relationship for a user to efficiently develop a useable strategy to mine the data for pertinent and valuable information. Thus, despite the fact that users might know what particular piece of information (i.e., a "target variable") they would like to extract, they still must also know the correct dimensional parameters (e.g., viewing parameters) that will allow them to view a perspective of the data that will provide the desired mined data.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to data mining, and more particularly to systems and methods for providing automatic generation of data perspectives based on user-specified inputs. Machine learning techniques are leveraged to provide automatic generation of conditioning variables for a given target variable. This allows for construction of data perspectives such as, for example, pivot tables and/or OLAP cube viewers from user-desired parameters and a database. By providing automatic data perspective generation, the present invention permits inexperienced users to glean or 'data mine' additional valuable information from the database. It determines and analyzes the best target variable predictors for a given target variable, employing them to facilitate the conveying of information about the target variable to the user. The present invention automatically discretizes continuous and discrete variables utilized as target variable predictors to establish their granularity and to enhance the conveying of information to the user.

In other instances of the present invention, the user can also specify a complexity parameter to facilitate automatic generation of the data perspective in determining a set of best target variable predictors and their complexity (e.g., complexity of conditioning variable(s)). The present invention can also adjust the conditioning variables (ie., target variable predictors) of the data perspective to provide an optimum view and/or accept control inputs from a user to guide/control the generation of the data perspective. Thus, the present invention provides a powerful and intuitive means for even novice users to quickly mine information from even the largest and most complex databases.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 4 is a table illustrating information from a database in accordance with an aspect of the present invention.

FIG. 5 is a table illustrating a data perspective for a given target variable from a database in accordance with an aspect of the present invention.

DETAILED DESCRIPTION OF THE INVENTION

Figure 1:
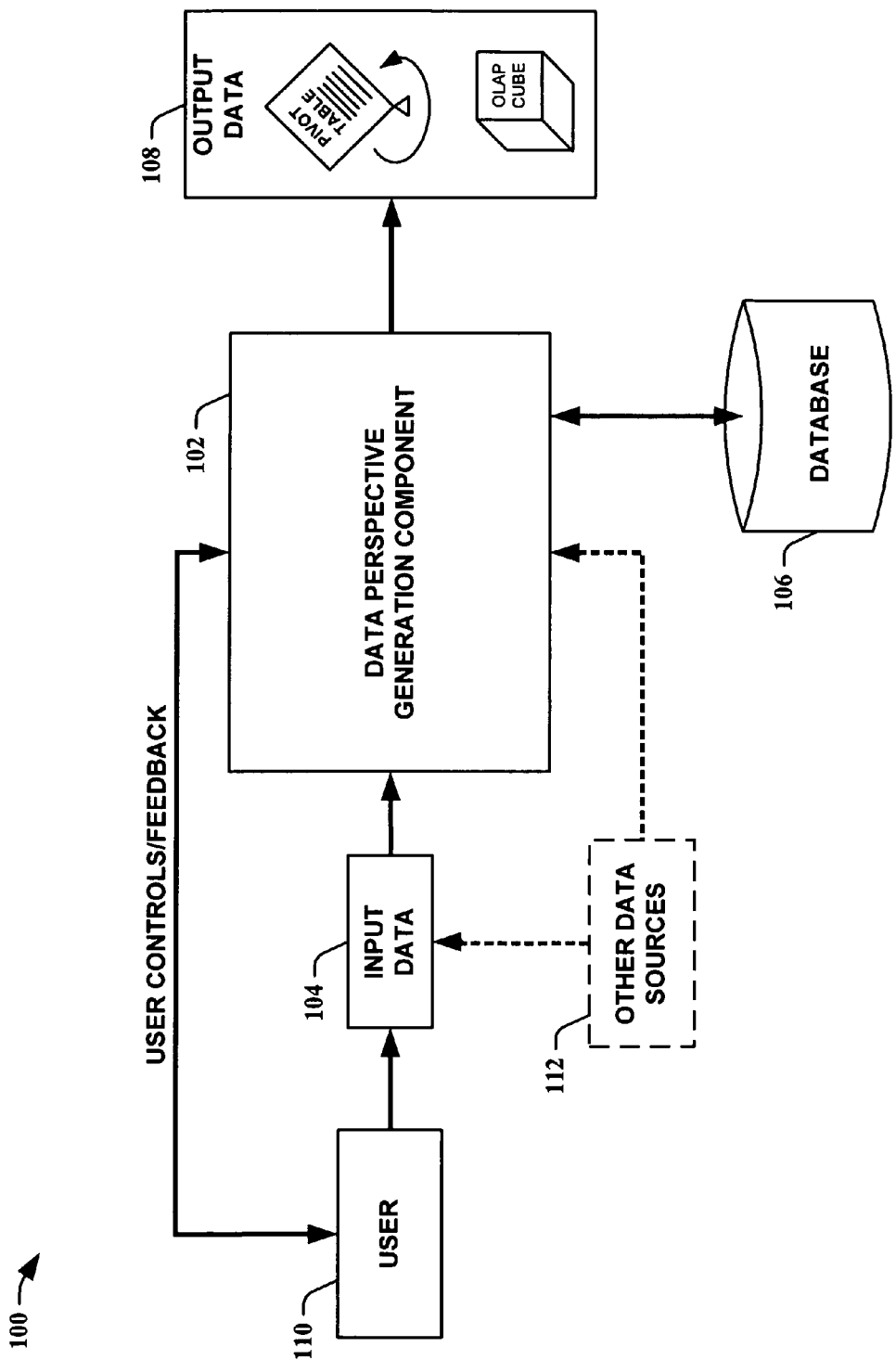
FIG. 1 is a block diagram of an automatic data perspective generation system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The present invention provides systems and methods of assisting a user by automatically generating data perspectives to facilitate in data mining of databases. In one instance of the present invention, the user selects the data of interest and specifies a target variable, an aggregation function, and a "complexity" parameter that determines how complicated the resulting table should be. The present invention then utilizes machine-learning techniques to identify which conditioning variables to include in a data perspective such as, for example, a top set and a left set of a Microsoft Excel brand spreadsheet pivot table (a pivot table is a data viewing instrument that allows a user to reorganize and summarize selected columns and rows of data in a spreadsheet and/or database table to obtain a desired view or "perspective" of the data of interest). In addition, the granularity of each of these variables is determined by automatic discretization of both continuous and discrete variables. Ranges of continuous variables are automatically assessed and assigned a new representative variable for optimum variable ranges. This allows the present invention to provide the best view/perspective of the data with the best predictor/conditioning variables for the target variable. Similarly, the present invention can also be utilized to provide dimensions (predictor/conditioning variables) of an OLAP cube and the like. OLAP cubes are multidimensional views of aggregate data that allow insight into the information through a quick, reliable, interactive process.

In FIG. 1, a block diagram of an automatic data perspective generation system 100 in accordance with an aspect of the present invention is shown. The automatic data perspective generation system 100 is comprised of a data perspective generation component 102 that receives input data 104 and accesses a database 106. It 102 automatically generates output data 108 that includes, but is not limited to, a pivot table and/or an OLAP cube and the like. Other instances of the present invention can also be utilized as an automatic generation source of predictor/conditioning variables for a given target variable. Thus, the present invention can be employed in systems without fully generating (i.e., without employing an aggregation function) a complete pivot table and/or OLAP cube and the like. The input data 104 provides information such as, for example, a target variable and data of interest. These parameters permit the present invention to automatically analyze and generate conditioning variables that best predict the target variable. The data perspective generation component 102 accesses the database 106 to retrieve relevant data utilized for generating a data perspective based on the input data 104. The input data 104 generally originates from a user 110 that selects parameters utilized to generate the data perspective.

One skilled in the art can appreciate that additional data and sources can be utilized by the present invention as represented by optional other data sources 112. The other data sources 112 can supply parameters to the input data 104 and/or to the data perspective generation component 102. The other data sources 112 can include, but are not limited to, environmental context data (e.g., user context environment), user profile data, overall system utility information (e.g., system designed to always skew results towards cost-saving measures), and available alternative database data (e.g., analysis information regarding selection and/or retrieval of data from an alternate source that can provide better predictors of the target variable) and the like.

In other instances of the present invention, the user 110 can interact with the data perspective generation component 102 and provide user controls/feedback regarding the automatic data perspective generation. For example, the user 110 can review, adjust and/or reject the automatically selected conditioning variables before the data perspective is constructed. Additional controls/feedback such as appropriate database selection, data sources, and/or appropriateness of ranges of continuous conditioning variables and the like can also be utilized by the present invention. These examples are meant to be illustrative only and are not meant to limit the scope of the present invention.

Figure 2:
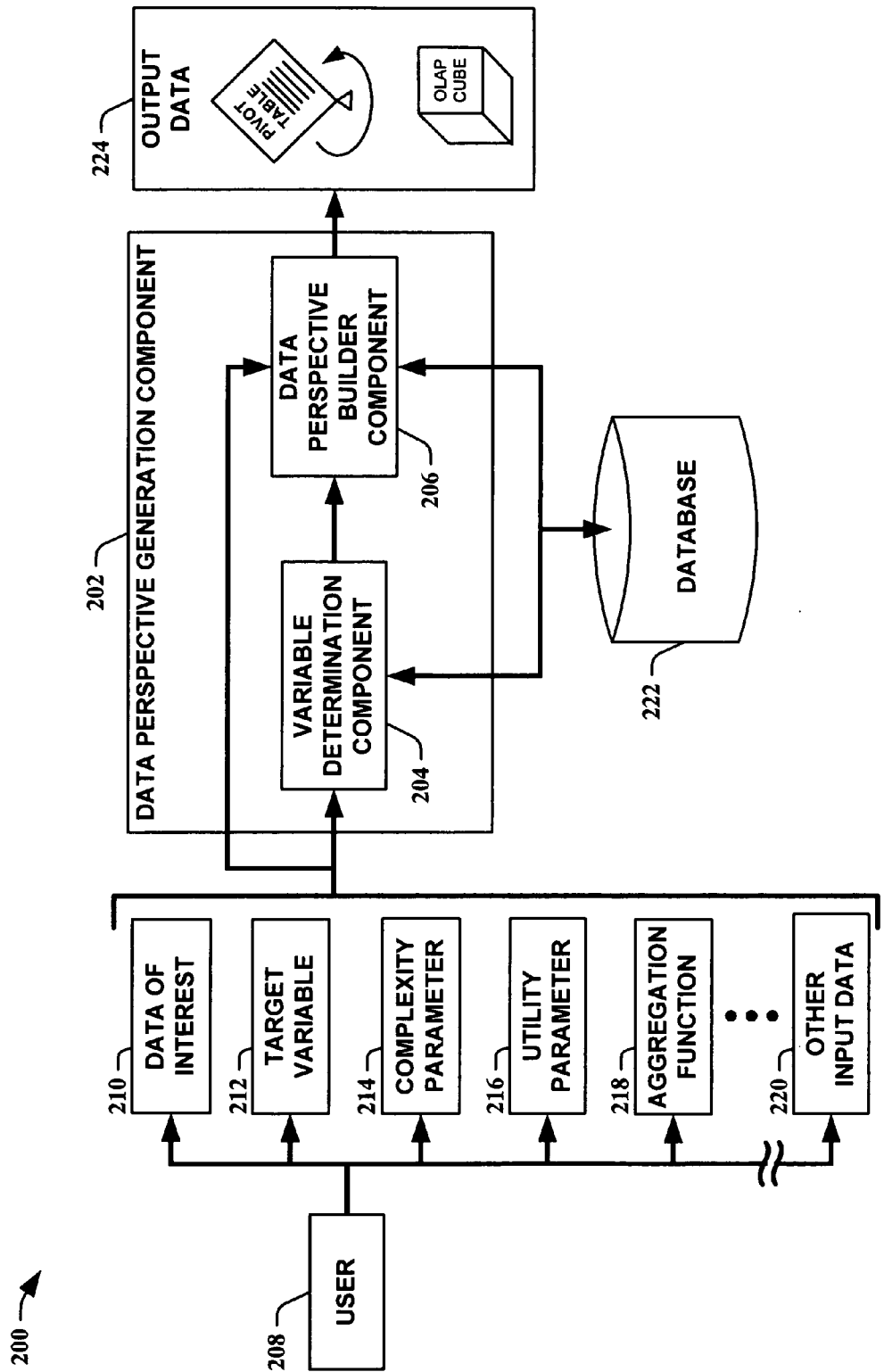
FIG. 2 is another block diagram of an automatic data perspective generation system in accordance with an aspect of the present invention.

Referring to FIG. 2, another block diagram of an automatic data perspective generation system 200 in accordance with an aspect of the present invention is depicted. The automatic data perspective generation system 200 is comprised of a data perspective generation component 202 that receives input data 210-220 from a user 208 and automatically generates output data 224 based on the input data 210-220 and a database 222. The input data 210-220, in this instance of the present invention, is comprised of data of interest 210, a target variable 212, a complexity parameter 214, a utility parameter 216, an aggregation function 218, and other input data 220. Typically, the user 208 provides the input data 210-220, however, other instances of the present invention can accept input data 210-220 from sources other than the user 208. Likewise, not all instances of the present invention require all the data represented by the input data 210-220. Instances of the present invention function appropriately with only the data of interest 210 and the target variable 212 as input data. These instances of the present invention can assume a default fixed complexity parameter and/or utilize a dynamic complexity parameter generated internally and/or externally as the input data complexity parameter 214. Similarly, the utility parameter 216 can be optional input data and/or generated internally based upon user preferences and/or profiles, etc. Other instances of the present invention generate conditioning variables as the output data 224 and, therefore, do not utilize/require the aggregation function 218. The aggregation function 218 is employed during construction of a data perspective such as, for example, a summing function for a pivot table. Other input data 220 can include, but is not limited to, environmental data, user profile data, user preferences, and overall system function goals and the like The data perspective generation component 202 is comprised of a variable determination component 204 and a data perspective builder component 206. In a typical instance of the present invention, the variable determination component 204 receives the data of interest 210, the target variable 212, and the complexity parameter 214. It 204 utilizes these inputs to identify and determine the best predictors/conditioning variables of the target variable 212 based on the database 222. The variable determination component 204 also automatically determines granularity of the conditioning variables including ranges of identified continuous conditioning variables. It employs machine learning techniques to facilitate in finding the best predictors of the target variable 212. The data perspective builder component 206 receives the selected conditioning variables and constructs a data perspective based on these conditioning variables, the database 222, and the aggregation function 218. The data perspective builder component 206 outputs the data perspective as output data 224. The data perspective can be, but is not limited to, a pivot table and/or an OLAP cube and the like. In other instances of the present invention, the data perspective builder component 206 is optional and the output data 224 is comprised of the identified conditioning variables from the variable determination component 204, negating the utilization of the aggregation function 218.

The variable determination component 204 can utilize conditioning variable characteristic inputs to control/influence the identification of the conditioning variables. Other instances of the present invention do not utilize these conditioning variable characteristic inputs. These inputs include the complexity parameter 214 and the utility parameter 216 and the like. The conditioning variable characteristic inputs are utilized by the variable determination component 204 in its machine learning processes to incorporate desired characteristics into the data perspective. These characteristics include, but are not limited to, complexity of the data perspective and utility of the data perspective and the like. One skilled in the art can appreciate that other characteristics can be incorporated within the scope of the present invention.

Figure 3:
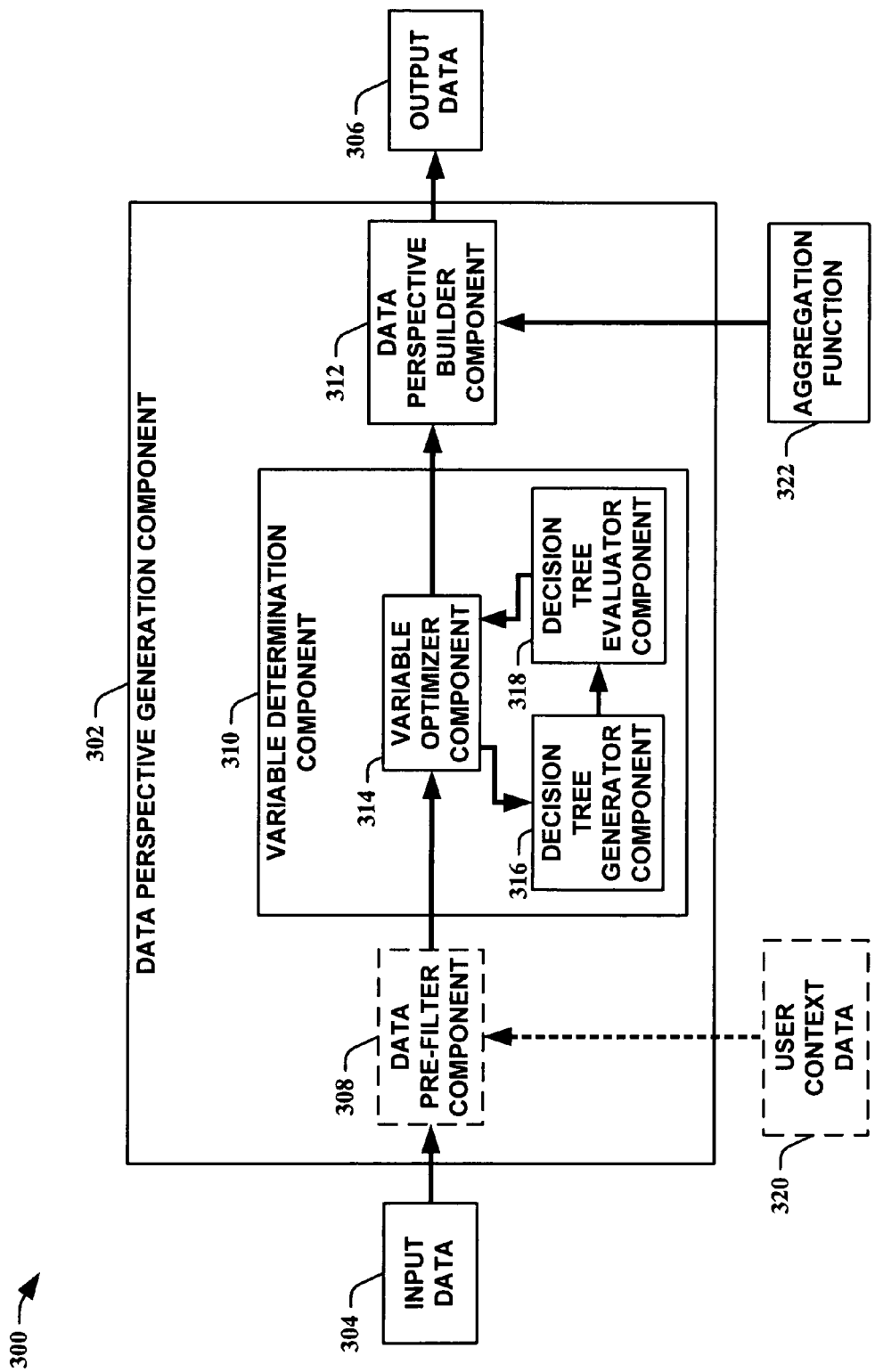
FIG. 3 is yet another block diagram of an automatic data perspective generation system in accordance with an aspect of the present invention.

Turning to FIG. 3, yet another block diagram of an automatic data perspective generation system 300 in accordance with an aspect of the present invention is illustrated. The automatic data perspective generation system 300 is comprised of a data perspective generation component 302 that receives input data 304 and automatically generates output data 306 based upon the input data 304 and a database (not shown). The input data 304 includes, but is not limited to, a target variable and data of interest. The data perspective generation component 302 is comprised of an optional data pre-filter component 308, a variable determination component 310, and a data perspective builder component 312. The optional data pre-filter component 308 receives the input data 304 and performs a filtering of the input data 304 based on, for example, optional user context data 320. This allows the input data 304 to be conditioned before being processed to allow flexibility in how and what data is utilized by the data perspective generation component 302. The variable determination component 310 is comprised of a variable optimizer component 314, a decision tree generator component 316, and a decision tree evaluator component 318. The variable optimizer component 314 receives the optionally filtered input data from the data pre-filter component 308 and identifies the best predictors for the target variable by employing machine learning techniques, such as a complete decision tree learner. (A decision tree is complete if every path in the tree defines a unique set of ranges of values for every predictor variable used in the tree and every combination of values for these variables is covered by the tree.) Thus, in this instance of the present invention, starting from no predictor variables (corresponding to the trivial decision tree with no predictors), the variable determination component 310 in a greedy way determines the best set of predictor variables and their granularities as follows. The decision tree generator component 316 receives initial data from the variable optimizer component 314 and generates a complete decision tree with either one more predictor variable than the current best decision tree or one more split of a variable in the current best decision tree. The score for this alternative complete decision tree is evaluated by the decision tree evaluator component 318. The variable optimizer component 314 then receives the decision tree score and makes a determination as to whether that particular tree is now the current highest scoring complete decision tree. The variable determination component 310 continues the decision tree building, evaluation, and optimum determination until the highest scoring set of conditioning variables and their granularities are found. The data perspective builder component 312 receives the optimum conditioning variables and utilizes an aggregation function 322 to automatically construct a data perspective which is output as output data 306.

The supra example systems are utilized to employ processes provided by the present invention. These processes permit efficient data mining by even inexperienced users. The present invention accomplishes this by employing machine learning techniques that provide for automatic generation of data perspectives. In order to better understand how these techniques are incorporated into the present invention, it is helpful to understand the compilation components of various data perspectives, such as, for example, pivot tables. A pivot table is an interactive table that efficiently combines and compares large amounts of data from a database. Its rows and columns can be manipulated to view various different summaries of a source data, including displaying of details for areas of interest. These data perspectives can be utilized when a user wants to analyze related totals, especially when there is a long list of figures to sum, and it is desirable to compare several facts about each figure.

A more technical description of a pivot table is a table that allows a user to view an aggregate function of a target variable while conditioning on the values of some other variables. The conditioning variables are divided into two sets in a pivot table—the top set and the left set. The table contains a column for every distinct set of values in the cross product of the domains of the variables in the top set. The table contains a row for every distinct set of values in the cross product of the domains of the variables in the left set. For example, if the top set consists of 2 discrete variables with 2 and 3 states respectively, it will result in a table with 6 columns—and, similarly, for the rows defined by the left set variables. Each cell in the table contains the aggregate function for the target variable when the data is restricted to the given set of values for both the top set and the left set corresponding to that cell.

For example, assume that sales data exists that includes sales by region, representative, and month. A subset of the data might look like that shown in FIG. 4 which depicts a table 400 illustrating data from a database. The variables in the data (i.e., the columns) are Region 402, Representative 404, Month 406, and Sales 408. Utilizing Sales 408 as a target variable and Sum( ) as an aggregation function, a pivot table can be utilized to view the sum of sales for each region and each representative by selecting Region 402 as a conditioning variable for the top set of the pivot table (i.e., specifying that the top set contains the single variable Region 402), selecting Representative 404 as a conditioning variable for the left set of the table (i.e., specifying that the left set contains the single variable Representative 404), and setting the aggregation function to Sum( ). This produces a table 500 illustrated in FIG. 5 that shows a data perspective (e.g., pivot table) for a given target variable (e.g., Sales).

For a simple data example as that illustrated supra, it may be easy to select the appropriate conditioning variables (i.e., predictor variables) to utilize in a pivot table. For more complicated situations with many variables to choose from and/or many data records, it is much more difficult. The present invention, in part, solves two related problems in this respect. As described in greater detail infra, the invention automatically selects conditioning variables and the detail (or granularity) for each of these variables.

Figure 6:
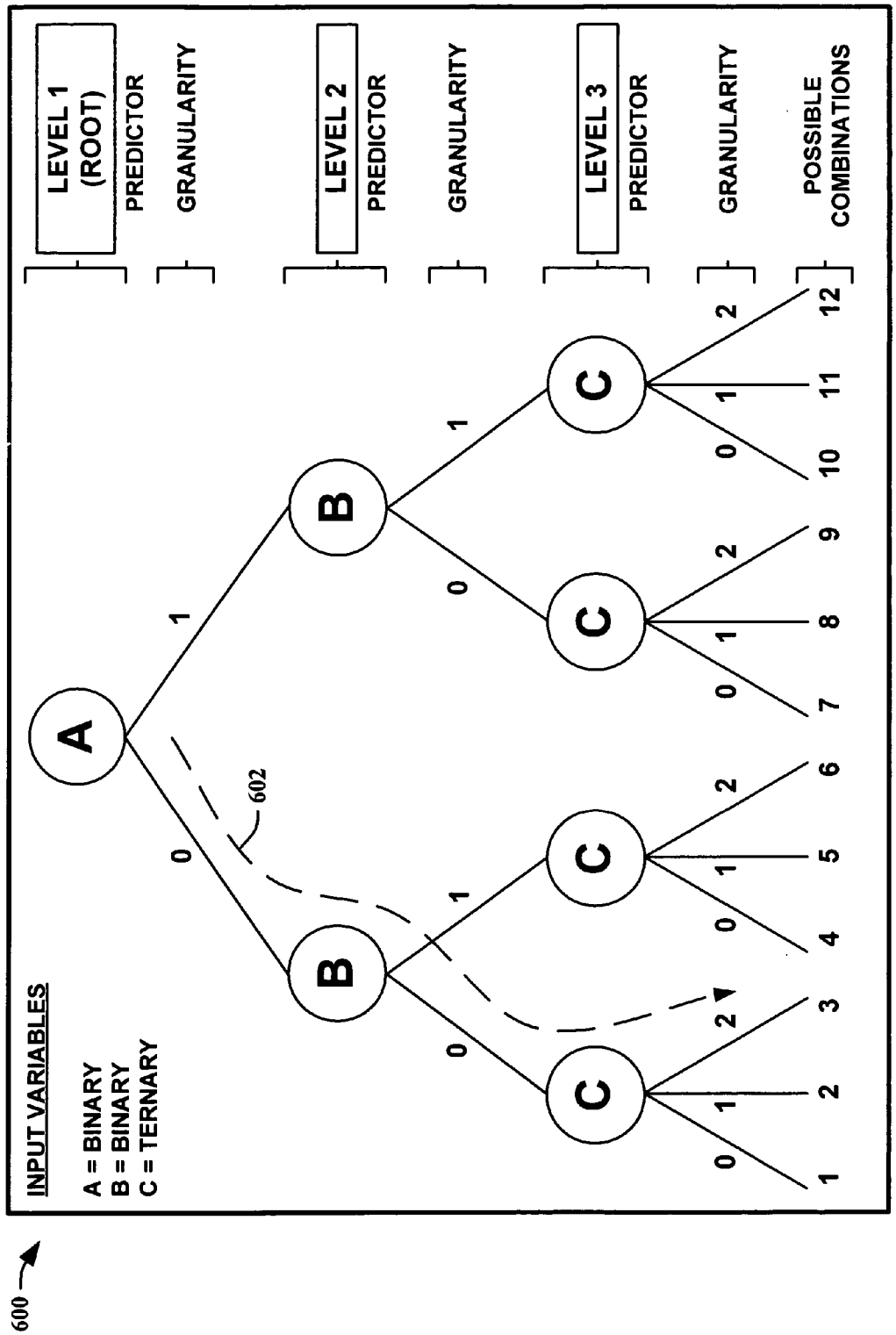
FIG. 6 is a graph illustrating a complete decision tree in accordance with an aspect of the present invention.

Essentially, the present invention first identifies a set of input variables and a granularity for those variables. Then, for any set of input variables and their corresponding granularity, it determines their quality for the purposes of generating, for example, a pivot table by evaluating the corresponding complete decision tree. The complete decision tree is defined such that every path in the tree prescribes a unique set of ranges of values for every predictor variable utilized in the tree and every combination of values for these variables is covered by the tree. For example, in FIG. 6, a graph 600 of a complete decision tree is shown. In this example, there are three input variables A, B, and C; where A and B are binary variables and C is a ternary variable. In this example, the binary states are represented by 0 and 1 values. However, the 0 and 1 values are representative only, and one skilled in the art will appreciate that these states can be discrete entities and/or ranges of continuous entities. The complete decision tree also provides a separate leaf for each of the 2*2*3=12 different possible combinations of values for variables A, B, and C. One (of many possible) complete decision trees can have a root split on variable A, then all splits at the next level on variable B, and then all splits on the third level on variable C as illustrated in the graph 600. A dashed line 602 represents a possible optimum evaluation path such that possible combination #3 provides a highest evaluation score.

The candidate predictor variables and their corresponding granularities are identified simultaneously utilizing a "normal" decision tree heuristic. Thus, for any given decision tree, the predictor variables are defined by the tree as every variable that has been split on in the tree, and the granularity is defined by the split points themselves. For example, suppose a tree contains a split on a ternary variable X that has X=2 down one branch and X=1 or 3 on the other; and the tree contains a split on a continuous variable Y that has Y<5 down one branch and Y≧5 down the other. This tree then defines two 'new' variables X' and Y', both of which are discrete: X' has two values: "2" and "1 or 3" and Y' has two values "<5" and ">5". If, for example, a new split is added in the tree on X where X=1 goes down one branch, and X=2 or 3 goes down the other. This new tree defines a new variable X" that has three values (1, 2, and 3). Therefore, the states of a predictor variable are defined by the intersection of the ranges defined by the splits. Thus, a single decision tree is converted into a set of predictor variables and corresponding values for those variables.

A heuristic employed by the present invention allows it to learn a single decision tree, and then search over sub-trees of that decision tree to find a good set of predictor variables and granularities. The first sub-tree that is generally considered is the root node, which corresponds to no predictor variables. Starting with this tree, a 'next' tree to consider is chosen by adding a single split from the full tree. Thus, after the first tree, the only next tree possible is the one that has the single root split. If there are multiple splits that can be added, the one that has the best predictor-variable-and-granularity score (i.e., evaluate the corresponding complete-tree score) is utilized. The current tree expansion is halted if no additional split increases the score (or if the current tree has been expanded to the full tree).

In one instance of the present invention, a user simply (1) selects the data of interest, (2) specifies a target variable, (3)

specifies an aggregation function, and (4) specifies a "complexity" parameter that determines how complicated the resulting table should be. The present invention then utilizes machine-learning techniques to identify which variables to include in a top set and in a left set. In addition, the granularity of each of these variables is determined by automatic discretization of both continuous and discrete variables. Traditionally, if a continuous variable is specified as a member of either the top set or the left set, each distinct value of that variable in the data is treated as a separate, categorical state. For example, if the data contains the variable "Age", and there are 98 distinct age values in the data, the traditional pivot table treats Age as a categorical variable with 98 states. The result of adding "Age" to the top (left) set of a pivot table is that the number of columns (rows) is multiplied by 98; it is unlikely that viewing data by each individual distinct age is useful. The present invention automatically detects interesting ranges of continuous variables, and creates a new variable corresponding to those ranges. For example, the present invention can determine that knowing whether Age>25 or Age≧25 is important; in this case, the present invention creates a new, categorical variable whose two values correspond to these ranges and inserts this new variable into a data perspective. For a categorical variable such as color, the present invention's automatic discretization can group states together. For example, if there are three colors red, green, and blue, the present invention can detect that red vs. any other color is a more interesting (transformed) variable, and utilize that as a member of the top set or the left set of a pivot table.

One instance of the present invention operates by exploiting the fact that a pivot table can be interpreted as a complete table (or equivalently, a complete decision tree) for a target variable given all of the variables in both a top set and a left set. There exist standard learning algorithms that identify which variables are best for predicting a target variable in this situation. For example, if the potential predictor variables are all discrete, a greedy search algorithm can be employed to select the predictors. When there are continuous variables, the search algorithm can also consider adding various discretized versions of those variables as predictors. Similarly, the search algorithm can consider various groupings of the states of categorical variables.

Another instance of the present invention utilizes the following very simple search algorithm to identify the predictors. First, a (regular) decision tree is learned for the target variable utilizing a standard greedy algorithm. Then, predictor variables are greedily added utilizing that decision tree. It is important to note that any sub-tree of the decision tree defines a set of predictor variables with a corresponding discretization of those variables. By starting with a sub-tree consisting of only a root node, the sub-tree is greedily expanded by including the children of a leaf node until the complete decision tree score for the corresponding variables does not increase. During this process, a particular sub-tree may not be complete. In this case, the tree is expanded to a complete tree for the variables under consideration at this stage.

One skilled in the art can appreciate that a complete decision tree score can be defined in many ways. One instance of the present invention utilizes a score which balances fit of data to a decision tree (e.g., measured by the conditional log-likelihood for target given predictors) with a visual complexity of a pivot table constructed according to this tree (e.g., measured by the number of cells in the pivot table—given by the cross product of states for the predictor variables). The complete decision tree score is in this way defined as:

$$\text{Score} = \text{conditional log-likelihood} - c \ast \text{visual complexity};$$

where c is a "complexity" factor chosen by the user. The user can, in addition, specify a threshold for the number of variables and/or the number of cells in a resulting pivot table.

Figure 7:
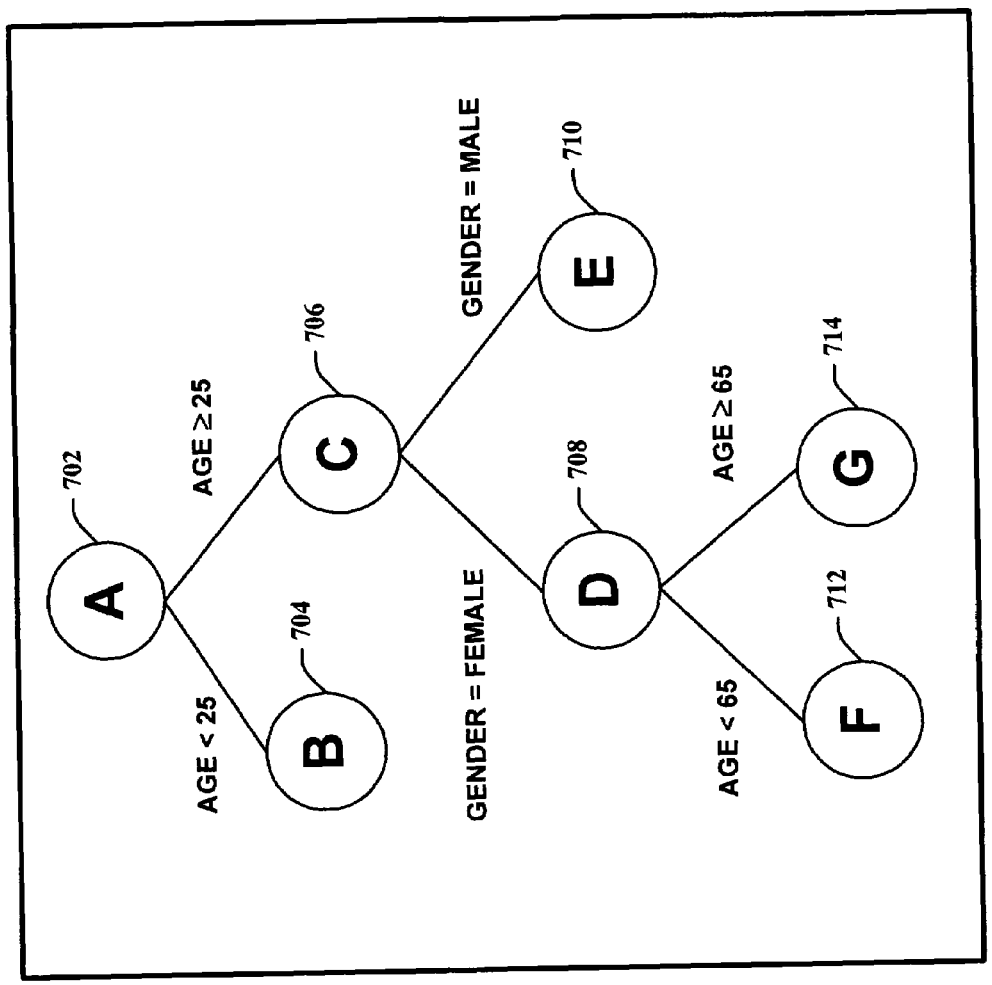
FIG. 7 is a graph illustrating a decision tree in accordance with an aspect of the present invention.

For example, in FIG. 7, a graph 700 illustrating a learned decision tree in accordance with an aspect of the present invention is shown. Initially, the sub-tree is simply the node A 702, corresponding to no predictors. The decision tree is expanded by considering the tree consisting of leaves B 704 and C 706. This sub-tree has a corresponding single binary predictor: DAge (discretized version of Age) with states "<25" and ">25." This sub-tree is complete and assuming that the complete decision tree score improves by adding DAge as a predictor of the target variable, node C 706 is next considered for expanding so that the new leaf nodes are B 704, D 708, E 710. Now there are two predictors: DAge and Gender. This decision sub-tree is not complete but can be made complete by adding a (fictitious) Gender split underneath the B 704 node as well. Assuming that the complete decision tree score is better with these two predictors than with only DAge, D 708 is then expanded so that the leaves of the sub-tree are B 704, F 712, G 714, E 710. Now there are still two predictors, but the discretization for Age is different: this sub-tree defines the variable DAge2 with states {<25, (25,65), >≧65}. Again, a corresponding (fictitious) complete decision tree is constructed, and if the complete decision tree score for predictors DAge2 and Gender is better than the score for predictors DAge and Gender, DAge2 is utilized instead. In this example, there was always a single leaf node to expand. If there are multiple leaf nodes, each expansion is scored as before, and the expansion (if any) that improves the complete decision tree score the most is committed next.

The final aspect of this instance present invention is, given a set of predictor variables, deciding which variables to include in a top set and which ones to include in a left set. The choice can be made so that the chart is the most visually appealing. For example, the variables can be arranged so the number of columns approximately equals the number of rows in a resulting pivot table.

One skilled in the art will appreciate that the present invention can be utilized to automatically construct other aspects of a data perspective such as a dimension hierarchy in an OLAP cube. In particular, the grouping and discretization of the variables define this hierarchy.

In view of the exemplary systems shown and described above, methodologies that may be implemented in accordance with the present invention will be better appreciated with reference to the flow charts of FIGS. 8-11. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the present invention.

Figure 8:
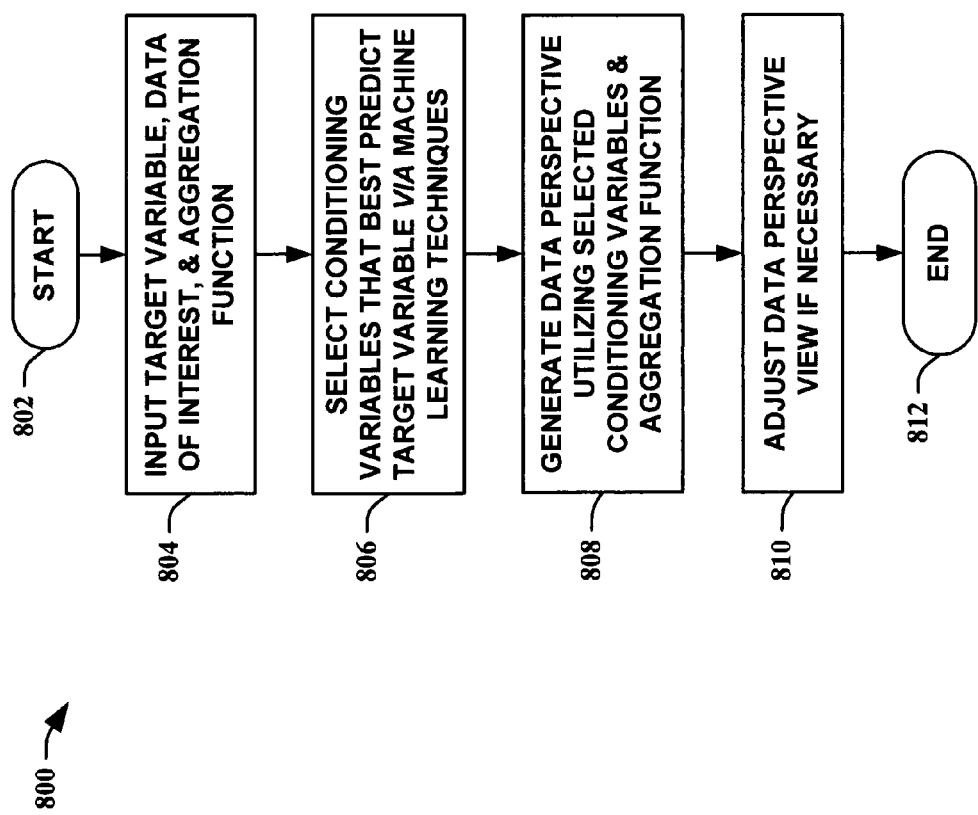
FIG. 8 is a flow diagram of a method of facilitating automatic data perspective generation in accordance with an aspect of the present invention.

In FIG. 8, a flow diagram of a method 800 of facilitating automatic data perspective generation in accordance with an aspect of the present invention is shown. The method 800 starts 802 by inputting a target variable, data of interest, and an optional aggregation function 804. The aggregation function is utilized in constructing a data perspective; however, the present invention can perform processing and make conditioning variables available even before the actual construction of the data perspective. Thus, the aggregation function is not necessary for determination of the conditioning variables for a given target. Conditioning variables are then automatically determined that best predict the target variable via utilization of machine learning techniques 806. The machine learning techniques can include, but are not limited to, decision tree learning, artificial neural networks, Bayesian learning, and instance based learning and the like. Essentially, each proposed conditioning variable is evaluated until an optimum set of variables and their granularity is determined utilizing the machine learning techniques. This is an automated step that can also be influenced by a user in other instances of the present invention. A user can elect to review the selected conditioning variables, their characteristics (e.g., detail, granularity, range, etc.), and/or another aspect of the process and influence the determination of these elements by restricting, modifying, and/or re-initiating them. Once the conditioning variables have been automatically selected, a data perspective is generated employing the selected conditioning variables and the aggregation function 808. The data perspective can include, but is not limited to, pivot tables and/or OLAP cubes and the like. As stated supra, in other instances of the present invention actual generation of the data perspective is optional, and the present invention can just output the conditioning variables without generating the data perspective. The view of the actual data perspective can also be adjusted automatically by the present invention 810, ending the flow 812. Machine learning techniques and/or user interface limitations and the like are applied to the resulting initial data perspective view. This allows the data perspective to be additionally enhanced for viewing by a user, increasing its value in disseminating information mined from a database by the automated process provided by the present invention.

Figure 9:
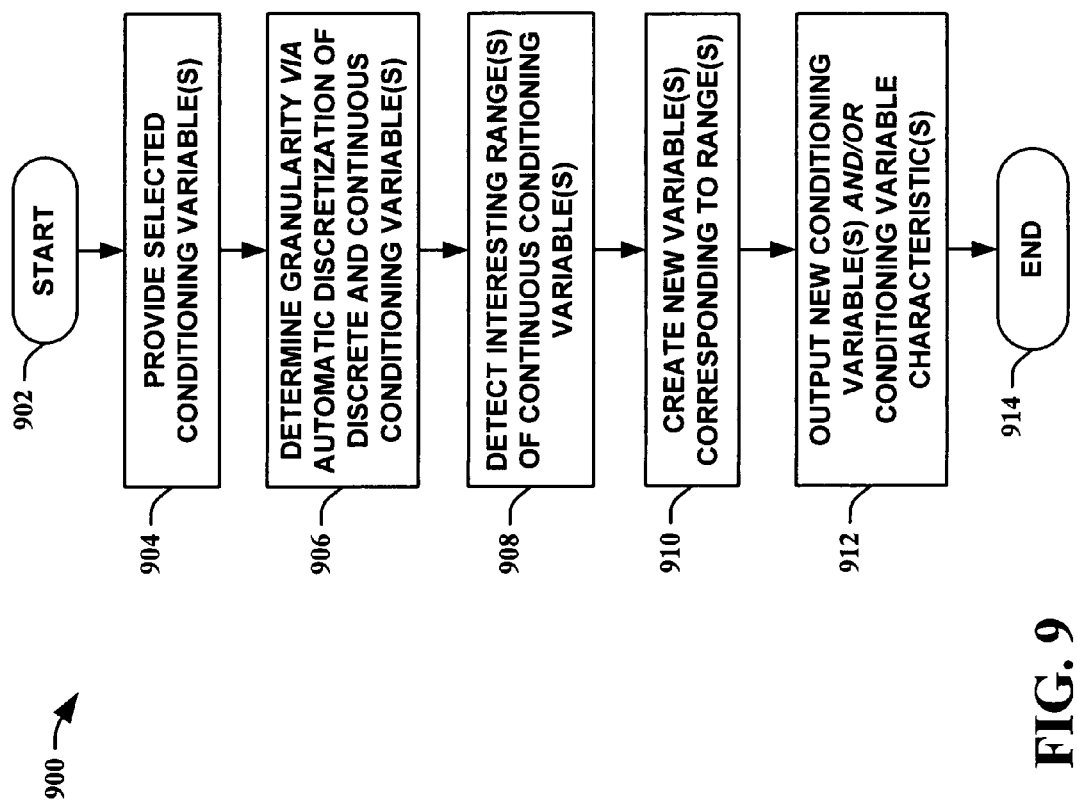
FIG. 9 is another flow diagram of a method of facilitating automatic data perspective generation in accordance with an aspect of the present invention.

Referring to FIG. 9, another flow diagram of a method 900 of facilitating automatic data perspective generation in accordance with an aspect of the present invention is illustrated. This method 900 depicts a process for automatically determining characteristics of the best predictor (i.e., conditioning variable) of a given target variable and generation of new variables to represent interesting ranges of continuous predictors. The method 900 starts 902 by providing selected conditioning variables 904. The selected conditioning variables have been selected via a prior machine learning technique described supra and can include both discrete and continuous variables. Granularity of the selected conditioning variables is then determined via automatic discretization of the variables 906. The discretization of the variables can utilize machine learning techniques such as complete decision tree processes and the like. The discretized variable with the highest score obtained from the machine learning technique is chosen for data perspective generation. If the selected conditioning variables include continuous variables, interesting ranges of the continuous variables are then detected 908. Interesting ranges can include, but are not limited to, high informational content density ranges, user-preferred ranges (i.e., user-control input), high probability/likelihood ranges, and/or efficient data view ranges and the like. Once a range is selected, the present invention can create a new variable corresponding to that range 910. For categorical variables, the automatic discretization step can group states together for utilization in a data perspective. The new conditioning variables (if any) and/or the conditioning characteristics are then output 912, ending the flow 914.

Figure 10:
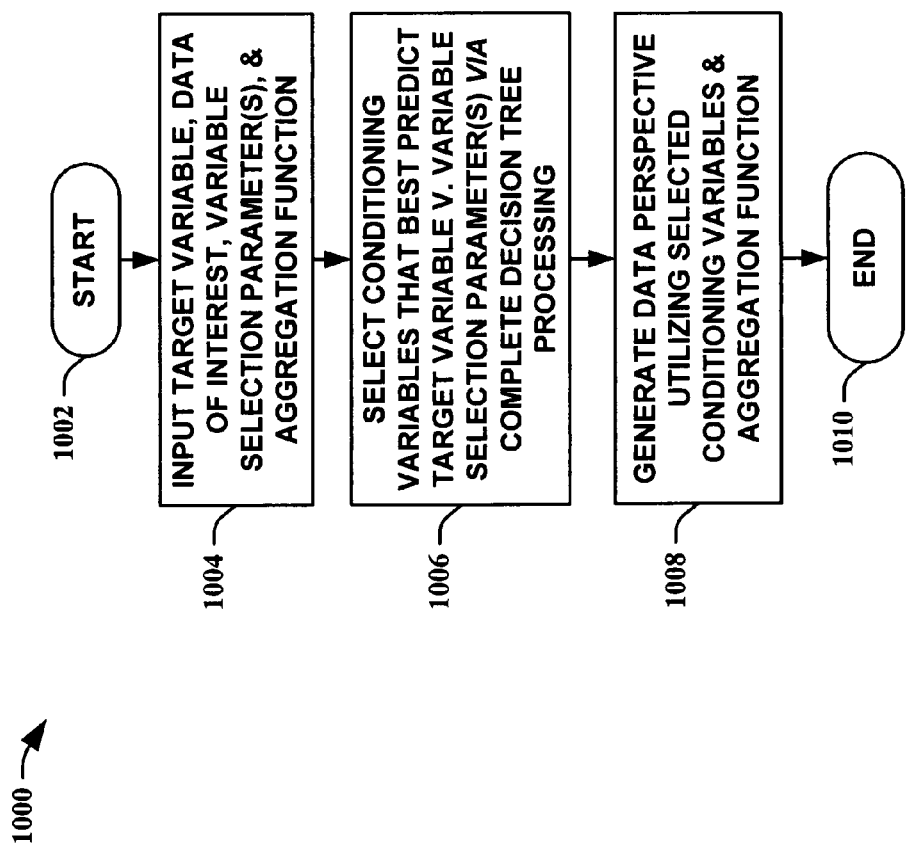
FIG. 10 is yet another flow diagram of a method of facilitating automatic data perspective generation in accordance with an aspect of the present invention.

Turning to FIG. 10, yet another flow diagram of a method 1000 of facilitating automatic data perspective generation in accordance with an aspect of the present invention is depicted. The method 1000 starts 1002 by inputting a target variable, data of interest, variable selection parameters, and an optional aggregation function 1004. As noted previously supra, the aggregation function is utilized in constructing a data perspective. However, the present invention can perform processing and make conditioning variables available even before the actual construction of the data perspective. Thus, the aggregation function is not necessary for determination of the conditioning variables for a given target. In this instance of the present invention selecting conditioning variables is based upon determining, via machine learning techniques, variables that best predict a target variable while accounting for the variable selection parameters 1006. The employed machine learning techniques can include, for example, complete decision tree learning processes. The variable selection parameters can include, but are not limited to, parameters such as complexity and/or utility and the like. Thus, a user can influence the automated data perspective generation process by inputting a complexity parameter and/or a utility parameter. The machine learning process then accounts not only for the best predictor aspect of a conditioning variable but also its selection parameter such as complexity and/or utility and the like. Thus, in this instance of the present invention, starting from no predictor variables (corresponding to a trivial decision tree with no predictors), a determination is made in a greedy way to select a best set of predictor variables and their granularities as follows. The initial data is input and a complete decision tree is generated with either one more predictor variable than a current best decision tree or one more split of a variable in the current best decision tree. The score for this alternative complete decision tree is then evaluated to determine as to whether that particular tree is now the current highest scoring complete decision tree. The decision tree construction, evaluation, and optimum determination are continued until the highest scoring set of conditioning variables and their granularities are found. Once the conditioning variables along with their characteristics are determined, a data perspective is generated utilizing the variables and their characteristics 1008, ending the flow 1010. It should be noted that actual generation of a data perspective is not necessary to implement the present invention. It can be utilized to provide only the conditioning variables.

Figure 11:
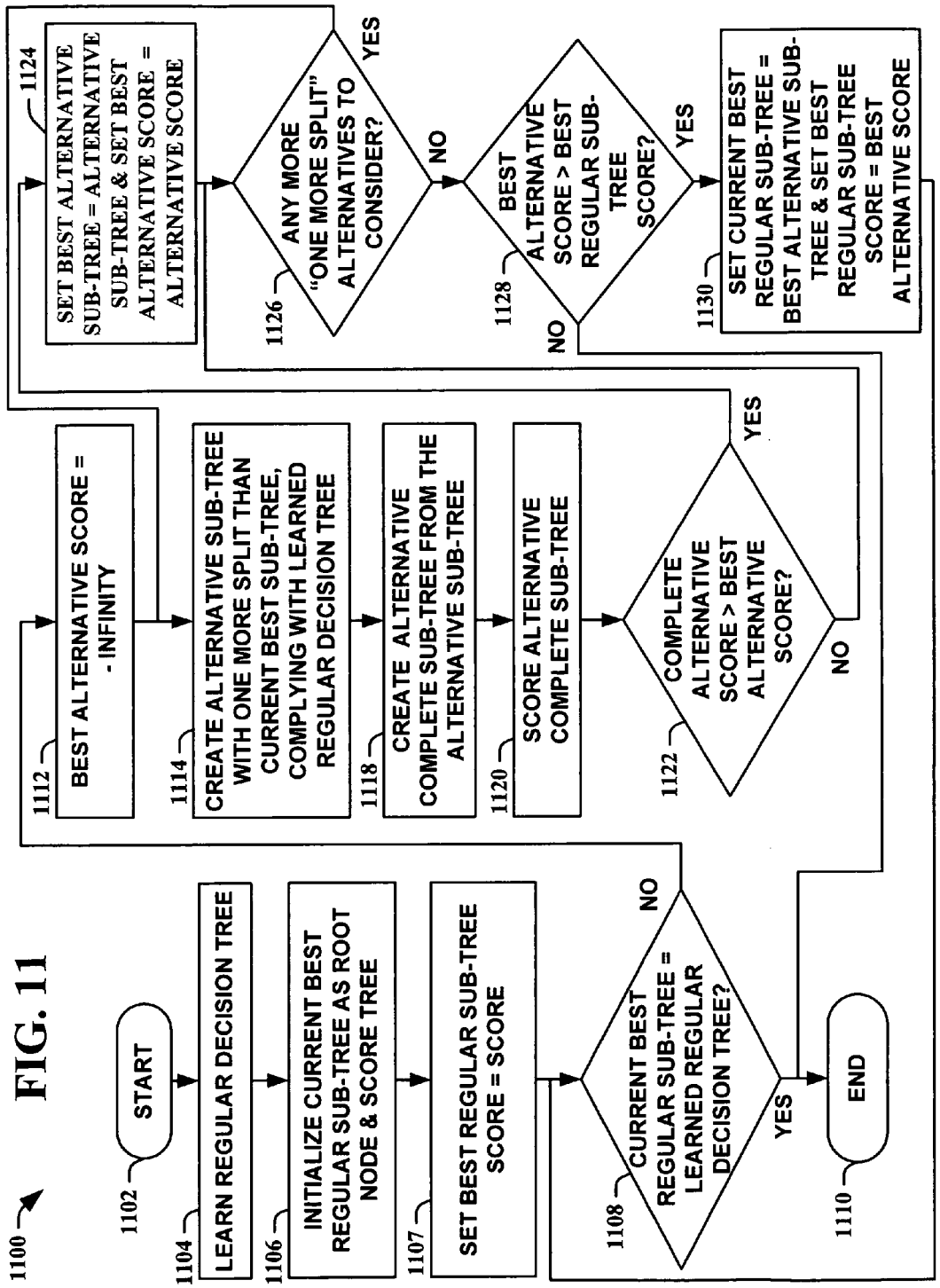
FIG. 11 is still yet another flow diagram of a method of facilitating automatic data perspective generation in accordance with an aspect of the present invention.

Looking at FIG. 11, still yet another flow diagram of a method 1100 of facilitating automatic data perspective generation in accordance with an aspect of the present invention is shown. The method 1100 is a heuristic process that is employed via a decision tree machine learning technique. The method 1100 starts 1102 by first learning a regular decision tree for a target variable via a greedy algorithm 1104. A current best regular sub-tree is then initialized as the root node and is scored 1106. The current best regular sub-tree score is set as this score 1107. A determination is then made as to whether the current best regular sub-tree is equal to the learned regular decision tree 1108. If yes, the flow ends 1110. If not, a best alternative score is set to minus infinity 1112. An alternative sub-tree is then created which has one more split than the current best sub-tree and complies with the learned regular decision tree 1114. An alternative complete sub-tree is constructed from the alternative sub-tree 1118 and scored 1120. A determination is then made as to whether the alternative complete sub-tree score is greater than the best alternative complete sub-tree score 1122. If greater, the best alternative (non-complete) sub-tree is set equal to the alternative (non-complete) sub-tree and the best alternative score is set equal to the alternative score 1124 before the determination is then made as to whether there are any more "one more split" alternatives to consider 1126. If yes, the next alternative is created 1114 and continues as described supra. If no more alternatives exist for consideration, a determination is made as to whether the best alternative score is greater than the best regular sub-tree score 1128. If not, the flow ends 1110. If greater, the best regular sub-tree is set equal to the current best alternative regular sub-tree and the best regular sub-tree score is set equal to the best alternative score 1130. The flow then continues by returning to the determination of whether the current best regular sub-tree is equal to the learned regular decision tree 1108 and continues as described supra. This heuristic process can be utilized to evaluate selections of conditioning variables along with their ranges and/or granularity and the like.

Figure 12:
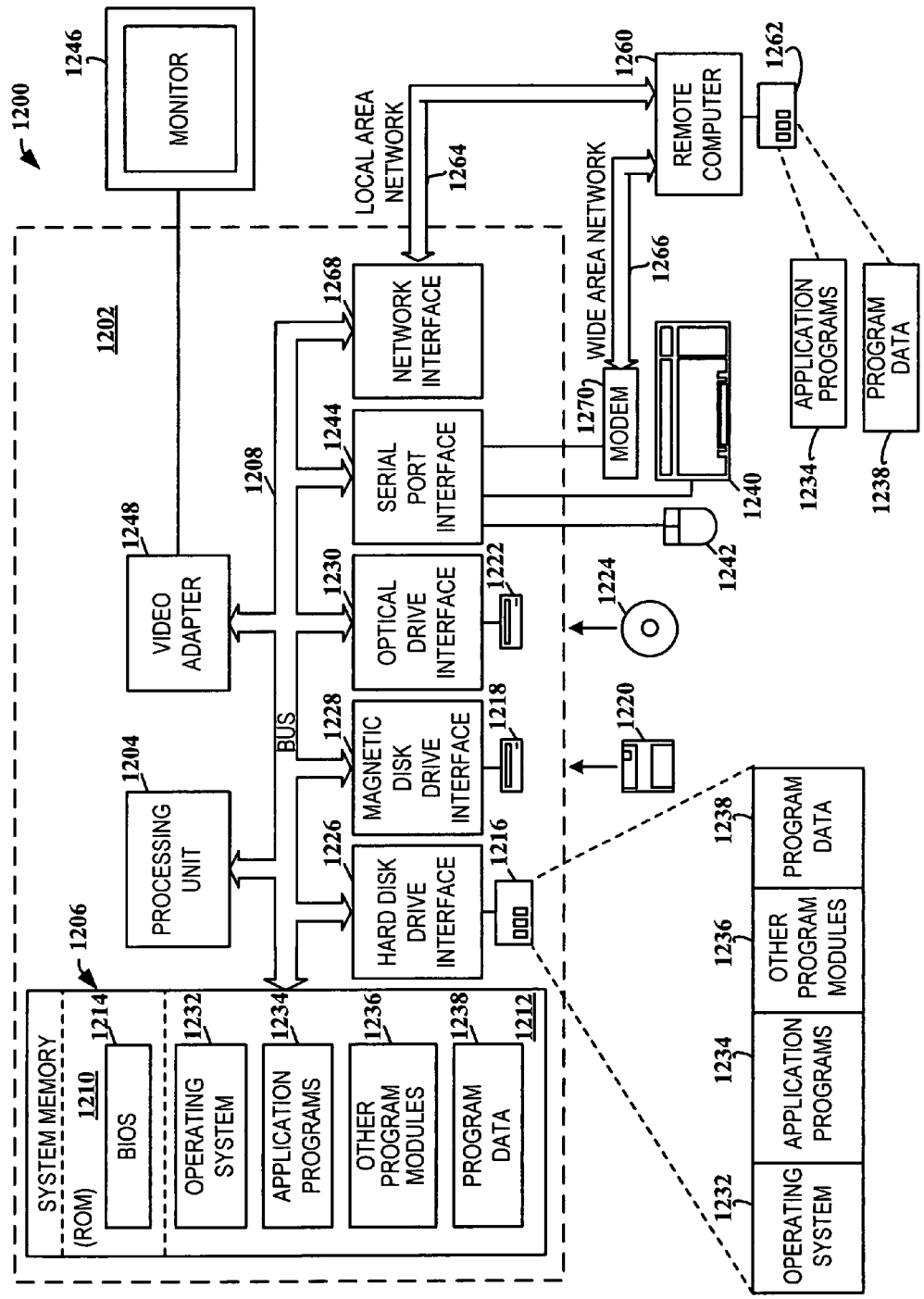
FIG. 12 illustrates an example operating environment in which the present invention can function.

In order to provide additional context for implementing various aspects of the present invention, FIG. 12 and the following discussion is intended to provide a brief, general description of a suitable computing environment 1200 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 12, an exemplary system environment 1200 for implementing the various aspects of the invention includes a conventional computer 1202, including a processing unit 1204, a system memory 1206, and a system bus 1208 that couples various system components, including the system memory, to the processing unit 1204. The processing unit 1204 may be any commercially available or proprietary processor. In addition, the processing unit may be implemented as multi-processor formed of more than one processor, such as may be connected in parallel.

The system bus 1208 may be any of several types of bus structure including a memory bus or memory controller, a peripheral bus, and a local bus using any of a variety of conventional bus architectures such as PCI, VESA, Microchannel, ISA, and EISA, to name a few. The system memory 1206 includes read only memory (ROM) 1210 and random access memory (RAM) 1212. A basic input/output system (BIOS) 1214, containing the basic routines that help to transfer information between elements within the computer 1202, such as during start-up, is stored in ROM 1210.

The computer 1202 also may include, for example, a hard disk drive 1216, a magnetic disk drive 1218, e.g., to read from or write to a removable disk 1220, and an optical disk drive 1222, e.g., for reading from or writing to a CD-ROM disk 1224 or other optical media. The hard disk drive 1216, magnetic disk drive 1218, and optical disk drive 1222 are connected to the system bus 1208 by a hard disk drive interface 1226, a magnetic disk drive interface 1228, and an optical drive interface 1230, respectively. The drives 1216-1222 and their associated computer-readable media provide nonvolatile storage of data, data structures, computer-executable instructions, etc. for the computer 1202. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 1200, and further that any such media may contain computer-executable instructions for performing the methods of the present invention.

A number of program modules may be stored in the drives 1216-1222 and RAM 1212, including an operating system 1232, one or more application programs 1234, other program modules 1236, and program data 1238. The operating system 1232 may be any suitable operating system or combination of operating systems. By way of example, the application programs 1234 and program modules 1236 can include an automatic data perspective generation scheme in accordance with an aspect of the present invention.

A user can enter commands and information into the computer 1202 through one or more user input devices, such as a keyboard 1240 and a pointing device (e.g., a mouse 1242). Other input devices (not shown) may include a microphone, a joystick, a game pad, a satellite dish, a wireless remote, a scanner, or the like. These and other input devices are often connected to the processing unit 1204 through a serial port interface 1244 that is coupled to the system bus 1208, but may be connected by other interfaces, such as a parallel port, a game port or a universal serial bus (USB). A monitor 1246 or other type of display device is also connected to the system bus 1208 via an interface, such as a video adapter 1248. In addition to the monitor 1246, the computer 1202 may include other peripheral output devices (not shown), such as speakers, printers, etc.

It is to be appreciated that the computer 1202 can operate in a networked environment using logical connections to one or more remote computers 1260. The remote computer 1260 may be a workstation, a server computer, a router, a peer device or other common network node, and typically includes many or all of the elements described relative to the computer 1202, although for purposes of brevity, only a memory storage device 1262 is illustrated in FIG. 12. The logical connections depicted in FIG. 12 can include a local area network (LAN) 1264 and a wide area network (WAN) 1266. Such networking environments are commonplace in offices, enterprise-wide computer networks, intranets and the Internet.

When used in a LAN networking environment, for example, the computer 1202 is connected to the local network 1264 through a network interface or adapter 1268. When used in a WAN networking environment, the computer 1202 typically includes a modem (e.g., telephone, DSL, cable, etc.) 1270, or is connected to a communications server on the LAN, or has other means for establishing communications over the WAN 1266, such as the Internet. The modem 1270, which can be internal or external relative to the computer 1202, is connected to the system bus 1208 via the serial port interface 1244. In a networked environment, program modules (including application programs 1234) and/or program data 1238 can be stored in the remote memory storage device 1262. It will be appreciated that the network connections shown are exemplary and other means (e.g., wired or wireless) of establishing a communications link between the computers 1202 and 1260 can be used when carrying out an aspect of the present invention.

In accordance with the practices of persons skilled in the art of computer programming, the present invention has been described with reference to acts and symbolic representations of operations that are performed by a computer, such as the computer 1202 or remote computer 1260, unless otherwise indicated. Such acts and operations are sometimes referred to as being computer-executed. It will be appreciated that the acts and symbolically represented operations include the manipulation by the processing unit 1204 of electrical signals representing data bits which causes a resulting transformation or reduction of the electrical signal representation, and the maintenance of data bits at memory locations in the memory system (including the system memory 1206, hard drive 1216, floppy disks 1220, CD-ROM 1224, and remote memory 1262) to thereby reconfigure or otherwise alter the computer system's operation, as well as other processing of signals. The memory locations where such data bits are maintained are physical locations that have particular electrical, magnetic, or optical properties corresponding to the data bits.

Figure 13:
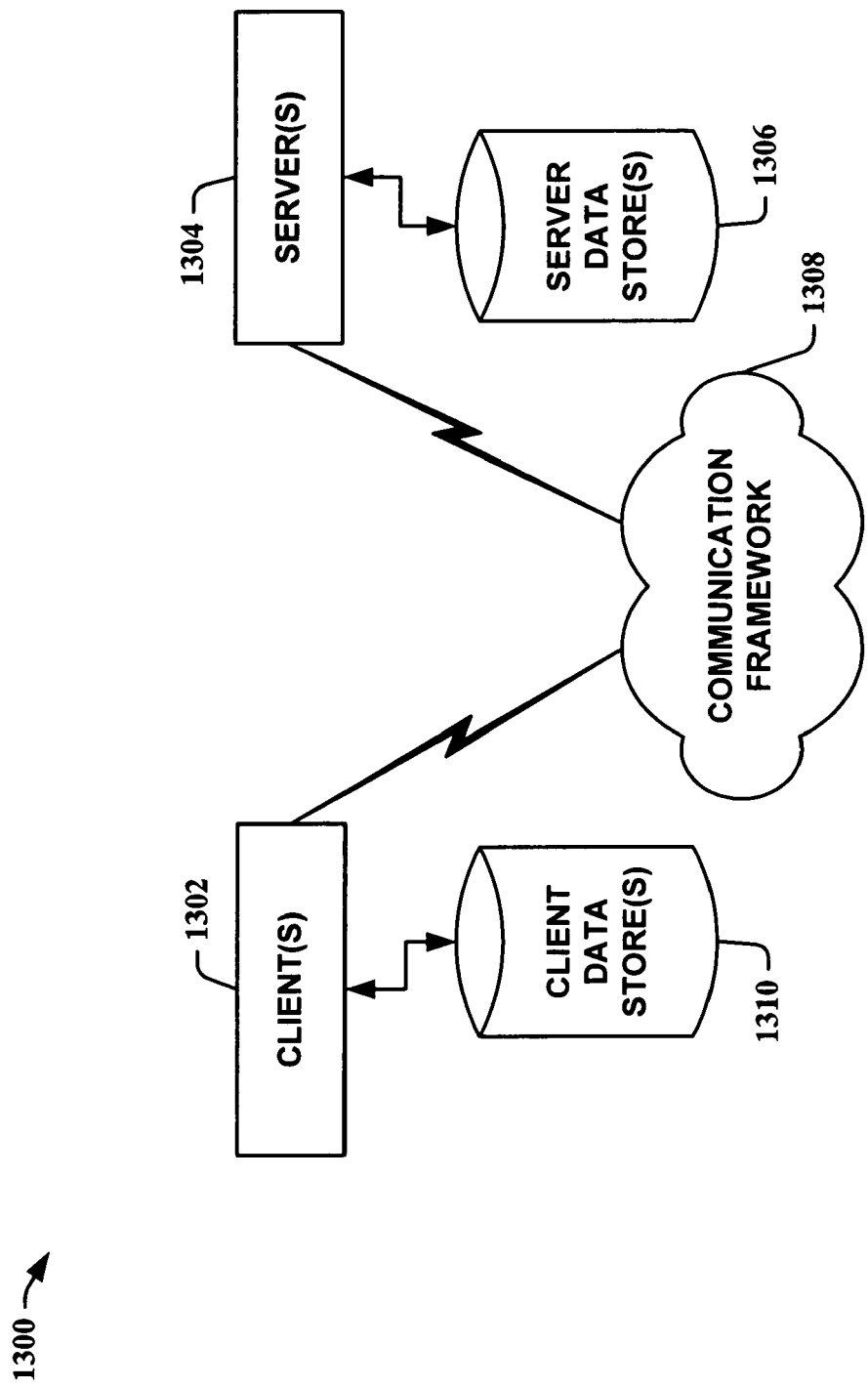
FIG. 13 illustrates another example operating environment in which the present invention can function.

FIG. 13 is another block diagram of a sample computing environment 1300 with which the present invention can interact. The system 1300 further illustrates a system that includes one or more client(s) 1302. The client(s) 1302 can be hardware and/or software (e.g., threads, processes, computing devices). The system 1300 also includes one or more server(s) 1304. The server(s) 1304 can also be hardware and/or software (e.g., threads, processes, computing devices). The server(s) 1304 can house threads to perform transformations by employing the present invention, for example. One possible communication between a client 1302 and a server 1304 may be in the form of a data packet adapted to be transmitted between two or more computer processes. The system 1300 includes a communication framework 1308 that can be employed to facilitate communications between the client(s) 1302 and the server(s) 1304. The client(s) 1302 are connected to one or more client data store(s) 1310 that can be employed to store information local to the client(s) 1302. Similarly, the server(s) 1304 are connected to one or more server data store(s) 1306 that can be employed to store information local to the server(s) 1304.

In one instance of the present invention, a data packet transmitted between two or more computer components that facilitates data perspective generation is comprised of, at least in part, information relating to a data perspective generation system that utilizes, at least in part, user-specified data, including a target variable of a database, to automatically generate at least one conditioning variable of a data perspective of the target variable from the database.

It is to be appreciated that the systems and/or methods of the present invention can be utilized in automatic data perspective generation facilitating computer components and non-computer related components alike. Further, those skilled in the art will recognize that the systems and/or methods of the present invention are employable in a vast array of electronic related technologies, including, but not limited to, computers, servers and/or handheld electronic devices, and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system that facilitates data perspective generation, comprising the following computer executable components stored on one or more computer readable media:
   a component which receives user-specified input data including a data of interest and a target variable from a database; and
   a generation component which provides automatic generation of at least one conditioning variable for a data perspective of the target variable, derived from, at least in part, the user-specified input data and the database, the conditioning variable determined by a heuristic method employed to construct a complete, single decision tree converted into a set of predictor variables and corresponding values for the predictor variables wherein at least one sub-tree of the single decision tree is searched over to find at least one optimum set of predictor variables and their granularities.

2. The system of claim 1, the data perspective comprising at least one selected from the group comprising a pivot table and an on-line analytical processing (OLAP) cube.

3. The system of claim 1, further comprising:
   a data perspective component which automatically generates the data perspective utilizing at least one automatically generated conditioning variable.

4. The system of claim 3, the data perspective component additionally adjusts a user view of the data perspective automatically to enhance its presentation to a user based on, at least in part, a machine learning technique.

5. The system of claim 4, wherein the system utilizes at least one user control input.

6. The system of claim 1, the generation component employs at least one machine learning technique which facilitates in the automatic generation of the conditioning variable.

7. The system of claim 6, the machine learning technique identifies at least one conditioning variable for at least one selected from the group consisting of a top set and a left set of the data perspective of the target variable.

8. The system of claim 6, the conditioning variable is controllable via a user control input.

9. The system of claim 6, the machine learning technique identifies the conditioning variable based on its ability to predict the target variable versus the complexity of the conditioning variable(s).

10. The system of claim 9, the machine learning technique additionally applies utility of a variable in identifying the conditioning variable.

11. The system of claim 6, the conditioning variable comprising at least one selected from the group consisting of a discrete conditioning variable and a continuous conditioning variable.

12. The system of claim 11, the machine learning technique additionally automatically determines granularity of the conditioning variable via discretization.

13. The system of claim 12, the granularity is adjustable via a user control input.

14. The system of claim 12, the machine learning technique determines the granularity of the conditioning variable based on its ability to predict the target variable versus the complexity of the conditioning variable(s).

15. The system of claim 14, the machine learning technique additionally applies utility of a granularity of a conditioning variable in identifying the granularity of the conditioning variable.

16. The system of claim 11, the machine learning technique automatically determines at least one range of the continuous conditioning variable and represents the range as a new conditioning variable.

17. The system of claim 16, the range is adjustable via a user control input.

18. The system of claim 16, the machine learning technique determines the range of the continuous conditioning variable based on its ability to predict the target variable versus the complexity of the conditioning variable(s).

19. The system of claim 18, the machine learning technique additionally applies utility of a range of a continuous variable in identifying the range of the continuous conditioning variable.

20. The system of claim 18, the machine learning technique employs at least one complete decision tree that facilitates in determination of the range of the conditioning variable.

21. The system of claim 20, the machine learning technique utilizes at least one heuristic method to construct the complete decision tree.

22. A method for facilitating data perspective generation, implemented at least in part by a computing device, the method comprising:

receiving user-specified input data including a data of interest and a target variable from a database;

automatically generating at least one conditioning variable for a data perspective of the target variable, derived from, at least in part, the user-specified input data and the database;

generating the conditioning variable by learning a single decision tree comprising a complete decision tree;

converting the single decision tree into a set of predictor variables and corresponding values for the predictor variables; and searching over at least one sub-tree of the single decision tree to find at least one optimum set of predictor variables and their granularities.

23. The method of claim 22, automatically generating the data perspective further including:

employing at least one machine learning process to facilitate in automatically generating the conditioning variable.

24. The method of claim 23, the machine learning process comprising:

identifying at least one conditioning variable for at least one selected from the group consisting of a top set and a left set of the data perspective of the target variable; the conditioning variable identified based on its ability to predict the target variable versus the complexity of the conditioning variable(s);

automatically determining granularity of a discrete conditioning variable; the granularity of the conditioning variable based on its ability to predict the target variable versus the complexity of the conditioning variable(s); and determining at least one range of a continuous conditioning variable and representing the range as a new conditioning variable; the range of the conditioning variable based on its ability to predict the target variable versus the complexity of the conditioning variable(s).

25. The method of claim 24, identifying the conditioning variable comprising:

employing at least one complete decision tree to determine at least one optimum conditioning variable and its granularity that best predicts the target variable; the complete decision tree constructed utilizing at least one heuristic method.

26. The method of claim 22, searching over at least one sub-tree comprising:

selecting a first sub-tree with a root node with no predictor variables;

choosing a second sub-tree by adding a single split from the single decision tree; the single split selected via evaluation of splits for an optimum score; and halting when at least one selected from the group consisting of an occurrence of no additional splits increasing the optimum score and an occurrence of the second sub-tree equating to the single decision tree.

27. The method of claim 24, further comprising:

adjusting, based on at least one user control input, at least one selected from the group consisting of a conditioning variable, a granularity of a conditioning variable, and a range of a continuous conditioning variable.

28. The method of claim 24, further comprising:

applying a utility value to facilitate in identifying and/or determining at least one selected from the group consisting of a conditioning variable, a granularity of a conditioning variable, and a range of a continuous conditioning variable.

29. The method of claim 22, further comprising:
automatically generating the data perspective utilizing at least one automatically generated conditioning variable.

30. The method of claim 29, further comprising:
adjusting a view of the data perspective automatically to enhance its presentation to a user based on, at least in part, a machine learning technique.

31. The method of claim 30, wherein the method utilizes at least one user control input.

32. The method of claim 22, the data perspective comprising at least one selected from the group consisting of a pivot table and an on-line analytical processing (OLAP) cube.

33. A computer implemented system that facilitates data perspective generation, comprising the following computer executable components stored on one or more computer readable media:
means for receiving user-specified input data including a data of interest and a target variable from a database; and
means for automatically generating at least one conditioning variable for a data perspective of the target variable, derived from, at least in part, the user-specified input data and the database;
the means for automatically generating at least one conditioning variable is configured to determine the conditioning variable by a heuristic method employed to construct a single, complete decision tree converted into a set of predictor variables and corresponding values for the predictor variables wherein at least one sub-tree of the single decision tree is searched over to find at least one optimum set of predictor variables and their granularities.

34. A device employing the method of claim 22 comprising at least one selected from the group consisting of a computer, a server, and a handheld electronic device.

35. A device employing the system of claim 1 comprising at least one selected from the group consisting of a computer, a server, and a handheld electronic device.

* * * * *